United States Patent [19]

Blomberg

[11] 4,068,102

[45] Jan. 10, 1978

[54] WALL-STAND FOR TELEPHONE SETS OF STANDING HANDSET TYPE

[75] Inventor: Knut Hugo Blomberg, Bromma, Sweden

[73] Assignee: Telefonaktiebolaget L M Ericsson, Stockholm, Sweden

[21] Appl. No.: 739,720

[22] Filed: Nov. 8, 1976

[30] Foreign Application Priority Data

Nov. 28, 1975  Sweden ................................. 7513460

[51] Int. Cl.² ............................................. H04M 1/11
[52] U.S. Cl. .............................. 179/146 R; 179/100 C
[58] Field of Search ............... 179/100 R, 100 C, 103, 179/146 R, 102, 147, 178, 179

[56] References Cited

U.S. PATENT DOCUMENTS

| 2,419,388 | 4/1947 | Blomberg et al. | 179/103 |
|---|---|---|---|
| 2,639,334 | 5/1953 | Fleming | 179/146 R |
| 3,548,117 | 12/1970 | Blomberg | 179/146 R |
| 3,878,343 | 4/1975 | Van de Wall | 179/100 R |
| 3,889,071 | 6/1975 | Davis et al. | 179/100 R |

FOREIGN PATENT DOCUMENTS

| 220,735 | 11/1967 | Sweden | 179/146 R |
|---|---|---|---|
| 888,997 | 2/1962 | United Kingdom | 179/100 R |

*Primary Examiner*—Kathleen H. Claffy
*Assistant Examiner*—Randall P. Myers
*Attorney, Agent, or Firm*—Hane, Roberts, Spiecens & Cohen

[57] ABSTRACT

A wall bracket for a one-piece telephone which has a transmitter in a flat base and a receiver at the end of an upright portion extending upward from the base includes a shelf and a roof member which can straddle the telephone. The shelf has a depth such that the center of gravity of the telephone when on the shelf is outward beyond an edge of the shelf so that the telephone if not further supported would rotate about the edge. The roof member extends obliquely toward the shelf and is separated therefrom by a distance such that when the telephone is upright it can pass between the shelf and roof member but thereafter when the telephone rotates about the edge of the shelf the roof member acts as a stop for the receiver end of the upright portion to prevent further rotation and locks the telephone in place.

3 Claims, 3 Drawing Figures

WALL-STAND FOR TELEPHONE SETS OF STANDING HANDSET TYPE

Telephone sets of the standing handset type have, besides a dial or a push-button set, a built-in switch in their base which is affected when the set is put on a table or other base to switch it between the speaking and signal positions.

The present invention relates to a wall-stand or wall bracket, in which such a set can be placed and alternately be used as wall- and table set, according to the varying needs of the subscriber. The depth of the wall-stand to the wall is small, but, in spite of this, it gives a solid holding of the set. Good mounting is possible because the bottom of the stand has a narrow shelf and the top a roof between which the set is inserted and automatically locked when the set is put down.

The invention will be further described with reference to the accompanying drawings wherein.

Figure 3:
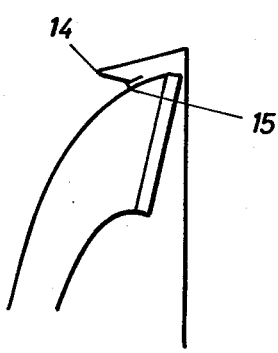

FIG. 3 a variant of the design of the roof.

Figure 1:
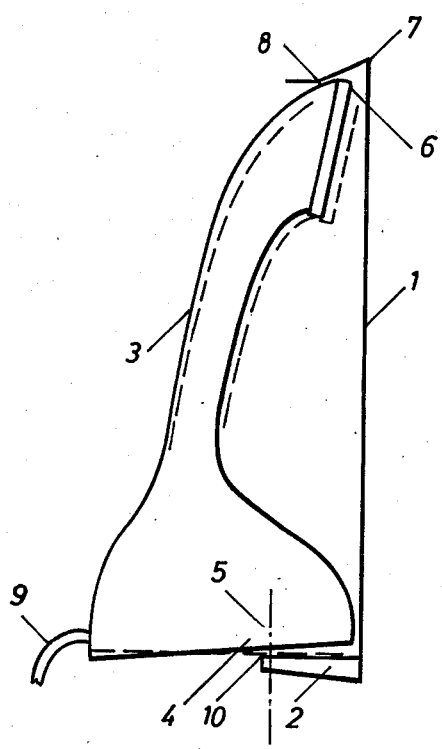
FIG. 1 shows a side view of the mounting and telephone according to the principle of the invention.

FIG. 1 is a schematic diagram of the holding elements included in the wall-stand, seen from the side. The stand 1 which is to be fastened to the wall, has at its bottom a narrow shelf 2 of such a depth, that when the telephone set 3 is placed thereon, the switch arranged in the base 4 of the set which is marked with the centre line 5, will be pressed similarly as when the set is put on a table.

Above the top of the set 6, the wall-stand has a roof 7. The distance between the shelf and the lower edge 8 of the roof is such that when the set is inserted into the stand in the position marked with the broken lines, it can pass between the shelf and the roof. When the set is put down, the back part of the foot of the set will sink downwards owing to the weight of the telephone instrument cable 9 and the telephone set 3, the center of gravity being outside the outer edge 10 of the shelf 12. The set thus rotates the front edge, whereby the top of the set tilts backwards and upwards until the set has the position indicated with continuous lines. Then, the top touches the roof within the edge 8 and the set is locked in a firm grip, owing to the height of the set which is now greater than the distance between the shelf and the roof.

When the subscriber will again use the set, he automatically lifts it up a little, whereby it will be free from the grip and can easily be pulled out of the stand.

Figure 2:
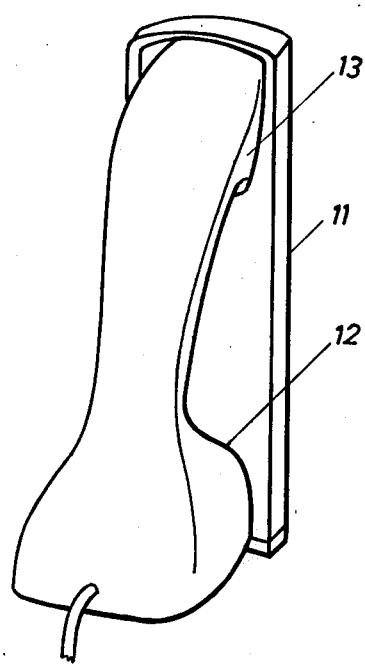
FIG. 2 shows in perspective an embodiment of a complete wall-stand.

In FIG. 2, an embodiment of a complete wall-stand is shown. The stand consists of a shallow casing 11 of plastic material, suitably fastened on the wall. In the lower part, it has a cup-shaped hollow depression 12 for the insertion of the front part of the set foot which then will rest against the lower plane wall of the cup. In the upper part, the stand has another cup-shaped depression 13, with a form adapted to the receiver end of the telephone and which upper wall forms the described roof.

It is necessary to take into account that the mass produced plastic parts used in the telephone construction are not exactly identical in different copies. Thus, there will be small differences of measurements in the height of the telephone set and of the wall-stand. In order to compensate for these variations and not make the insertion of the telephone in the stand critical the roof of the stand should be resilient. In FIG. 3 such a resilient arrangement is shown. The resilient section 15 starts from the front part of the stand 14 has a slight inclination towards the lower part and then a sharp and short inward end. It can take up the whole or a smaller part of the breadth of the roof. With this design, the top of the telephone will easily slip under the spring during insertion but is efficiently blocked when the telephone tilts backwards. If necessary, the height of the spring can be adjusted by means of a special stand screw. The resilience can also be arranged in the stand. In order to make the grip of the telephone more firm, the sides of the cups of the stand can also be made resilient.

It is common in telephone sets of this type, to do the ringing by signalling in the receiver. With the end of the receiver of the telephone placed in the cup shaped depression in the stand as shown in FIG. 2, the ring intensity in the room will be considerably weakened. The stand should therefore be designed as an acoustic resonator, whereby a considerable amplification of the sound level is obtained. If a possibility to vary the level of the signal is wanted, the resonator can be provided with a simple acoustic aperture. There can also be placed in the stand an acoustic horn which conducts the sound from the receiver to sound openings in the casing.

The wall-stand can be a unit which is completely separate electrically from the telephone set. But, it can also be combined with the wall bracket of the telephone instrument cable and is then equipped with necessary connecting terminals for the cable and the telephone circuit. If the connection of the telephone set is to be carried out with a plug and jack, the stand should be designed with a space under the shelf in which the jack is installed. The free space under the casing between the two cup shaped depressions can be used, for example, for installing the bell of another signal instrument if signalling in the receiver is not used.

A switch can be arranged in the shelf which is affected when the telephone set is placed in the stand and carries out special connecting functions in this position.

I claim:

1. A wall bracket for a one-piece telephone having a flat base with a transmitter in the base and a receiver at the end of an upright portion extending upward from the base, said wall bracket comprising a casing suitable for fastening to a wall a shelf in one end of said casing for supporting a portion of the flat base of the telephone, the shelf having a depth such that when the base of the telephone is on the shelf the center of gravity of the telephone is located outwards beyond the shelf whereby the telephone if further unsupported will rotate about an axis defined by an edge of the shelf, and a roof member in the other end of said casing which extends outwardly and downwardly toward said shelf, the spacing between said shelf and said roof member being such that when said telephone is upright the telephone can freely pass between said shelf and said roof member, but when after the base telephone is on said shelf and the receiver under said roof member and the telephone begins to rotate about said axis away from said casing the receiver end of said upright portion abuts the roof member to prevent further rotation of the telephone whereby the telephone is fixedly supported between said shelf and said roof member.

2. The wall bracket of claim 1 wherein said roof member is resiliently biased toward said shelf to accommodate minor deviations in the height of different telephones.

3. The wall bracket of claim 2 wherein said shelf is defined by a first recess in said casing and said roof member is defined by a second recess in said casing.

* * * * *